US006895899B2

(12) United States Patent
Schrader

(10) Patent No.: US 6,895,899 B2
(45) Date of Patent: May 24, 2005

(54) ANIMAL WASTE CONTAINMENT SYSTEMS

(76) Inventor: Rhonda Schrader, 947 Franklin Ave., Winthrop Harbor, IL (US) 60096

(*) Notice: Subject to any disclaimer, the term of this patent is extended or adjusted under 35 U.S.C. 154(b) by 0 days.

(21) Appl. No.: 10/703,314

(22) Filed: Nov. 7, 2003

(65) Prior Publication Data

US 2004/0094098 A1 May 20, 2004

Related U.S. Application Data

(63) Continuation-in-part of application No. 10/634,688, filed on Aug. 4, 2003, which is a continuation of application No. 10/121,100, filed on Apr. 11, 2002, now Pat. No. 6,626,129
(60) Provisional application No. 60/286,106, filed on Apr. 24, 2001.

(51) Int. Cl.[7] .......................... A01K 1/01; A01K 31/04
(52) U.S. Cl. ........................................ 119/479; 119/467
(58) Field of Search ............................. 119/479, 462, 119/467, 469, 463, 163, 450, 421

(56) References Cited

U.S. PATENT DOCUMENTS

| 3,429,297 | A |   | 2/1969  | Schroer         |
|-----------|---|---|---------|-----------------|
| 3,717,123 | A | * | 2/1973  | Regnier ........ 119/203 |
| 3,896,768 | A |   | 7/1975  | Galloway        |
| 4,009,685 | A |   | 3/1977  | Sojka           |
| 4,181,612 | A |   | 1/1980  | Trail           |
| 4,572,107 | A |   | 2/1986  | Clarizo         |
| 4,838,204 | A |   | 6/1989  | Young           |
| 4,913,095 | A |   | 4/1990  | Morrow et al.   |
| 5,148,771 | A |   | 9/1992  | Schuett et al.  |
| 5,156,640 | A |   | 10/1992 | Del Rosario     |
| 5,765,505 | A |   | 6/1998  | Yun             |
| 5,771,841 | A |   | 6/1998  | Boor            |
| 6,532,900 | B1| * | 3/2003  | Wang .......... 119/479 |

FOREIGN PATENT DOCUMENTS

WO    WO 98/04122    2/1998

* cited by examiner

Primary Examiner—Robert P. Swiatek
(74) Attorney, Agent, or Firm—Barnes & Thornburg LLP

(57) ABSTRACT

Filtration systems for animal enclosures such as bird cages are disclosed. A moving body of liquid through a receptacle, traps waste and airborne contaminants from the enclosures, a filtration unit filters the waste, and a pump circulates the liquid. A sterilizing unit may be connected to inhibit microbial growth. An auto shut-off valve may be used to control the pump.

26 Claims, 3 Drawing Sheets

ANIMAL WASTE CONTAINMENT SYSTEMS

CROSS-REFERENCE TO RELATED APPLICATIONS

This application is a continuation-in-part of U.S. Ser. No. 10/634,688 filed Aug. 4, 2003, which is a continuation of U.S. Ser. No. 10/121,100 filed Apr. 11, 2002, now U.S. Pat. No. 6,626,129 issued Sep. 30, 2003, which claims priority to provisional application No. 60/286,106, filed Apr. 24, 2001.

BACKGROUND

Maintaining birds or other pets or animals either in a residential or a commercial setting requires appropriate restraining and waste removal systems. Enclosures to restrain animals are typically made of wired or barred cages with floor bottoms. Some of these cages have grid floors to let the debris such as fecal matter, feathers, hair, bodily secretions, and left over food particles or other airborne particulates to pass through, while restraining one or more animals within the enclosures. To clean debris, newspaper liners, metallic pull-out trays, and other cleaning systems have been used.

SUMMARY

The present disclosure relates to a waste containment system that provides a filtration system to trap and filter particulate waste from an animal enclosure. The filtration system may be used, for example, with bird cages or any other enclosures for any other animals.

BRIEF DESCRIPTION OF THE DRAWINGS

The drawings are provided to illustrate some of the embodiments of the disclosure. It is envisioned that alternate configurations of the embodiments of the present disclosure maybe adopted without deviating from the disclosure as illustrated in these drawings.

DETAILED DESCRIPTION

Figure 1:
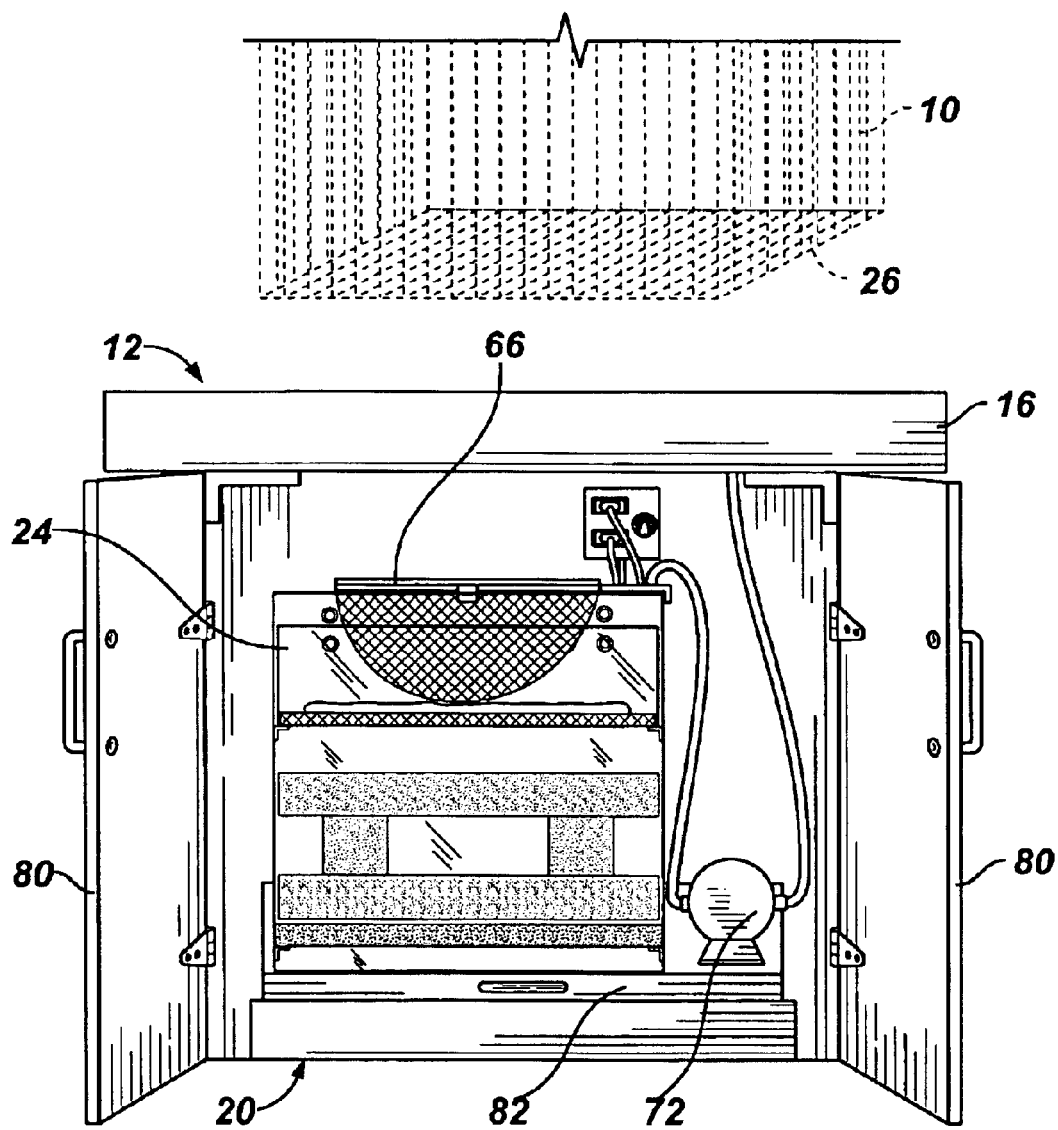
FIG. 1 is a front elevational view of a waste containment system in accordance with an illustrated embodiment of the present disclosure, with an animal enclosure schematically illustrated in partial view and with dashed lines.

While the concepts of the present disclosure are illustrated and described in detail in the drawings and the description below, such an illustration and description is to be considered as exemplary and not restrictive in character, it being understood that only the illustrative embodiment is shown and described and that all changes and modifications that come within the spirit of the disclosure are desired to be protected.

Figure 2:
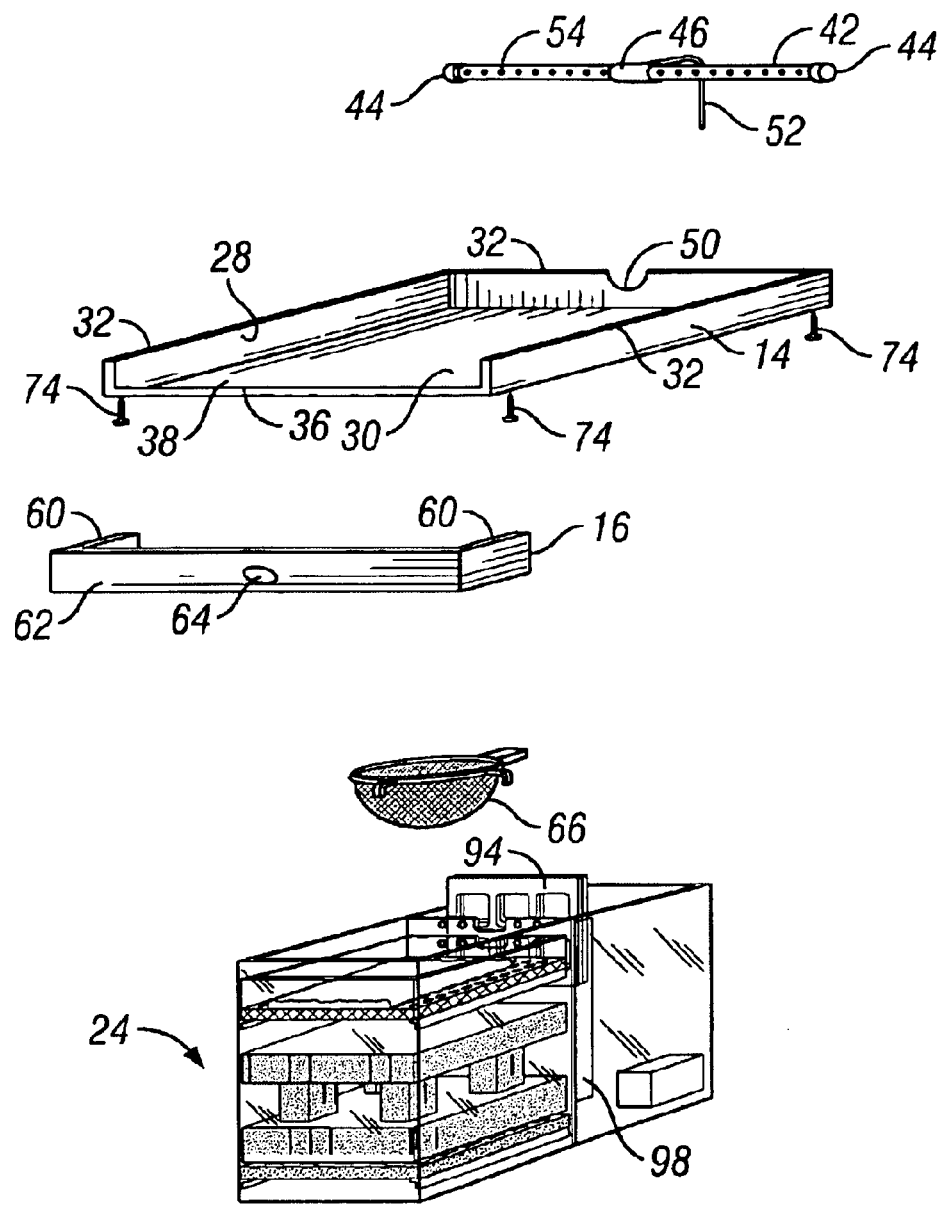
FIG. 2 is a partial exploded and partial perspective view of the waste containment system of FIG. 1, illustrating a tubing, a tray, a hopper, and a filtration unit.
Figure 3:
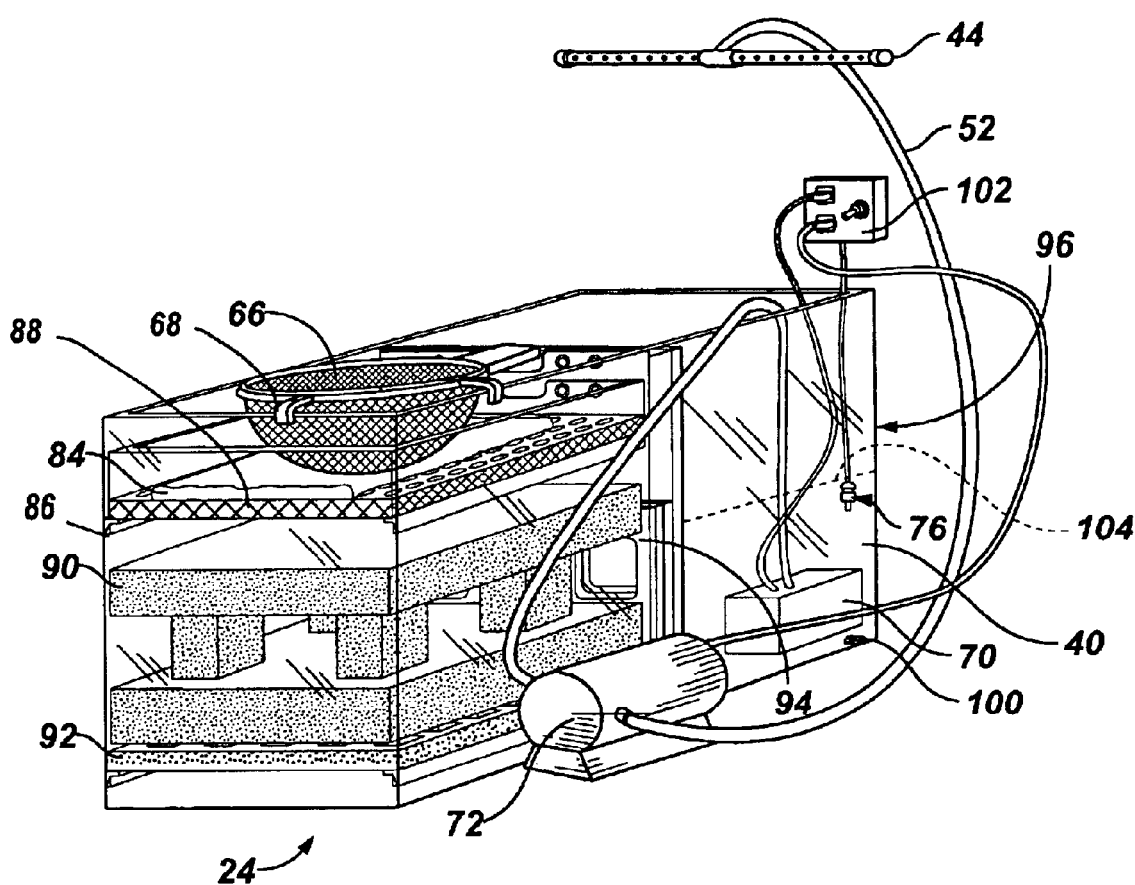
FIG. 3 is a partial perspective view of the waste containment system of FIG. 1 with various components removed to illustrate other components of the system.

FIGS. 1–3 illustrate an embodiment of a waste containment system of the present disclosure comprising an animal enclosure 10 and a filtration system 12 associated with the animal enclosure 10. The filtration system 12 comprises a tray 14, a hopper 16, a base member 20 and a filtration unit 24, each of which may have any suitable configuration and construction.

In the illustrated embodiment, the animal enclosure 10 has a grid floor 26 to allow waste materials to pass through.

The animal enclosure 10 may have any suitable configuration, construction, dimensions, and may retain any suitable animal. The animal enclosure 10 may be, for example, a bird cage to retain birds. Other suitable animals that can be retained in the enclosure 10 include for example, rodents, mice, reptiles, lizards, turtles, rabbits, and snakes. The filtration system 12 may filter waste materials such as, for example, fecal material, feathers, hair, dander, skin tissue, bodily secretions, and food material.

In the illustrated embodiment, the tray 14 has a floor 30, three raised sides 32 and a fourth side with an edge 36 defining a void 38. The tray 14 defines a cavity 28 for receiving a liquid 40. The tray 14 is positioned below the animal enclosure 10. The tray 14 or any other suitable receptacle is configured to permit passage of a liquid 40 and waste that passes through the grid floor 26 of the animal enclosure 10. The liquid 40, with such waste materials, drains from the tray 14 into a hopper 16 associated with the tray 14. The tray 14 slopes towards the edge 36 defining the void 38 to enable the liquid 40 to drain through the void 38 into the hopper 16. The tray 14 may be of any other form of any suitable receptacle and the cavity 28 may have any suitable configuration in accordance with other embodiments. The slope of the tray 14 can be adjusted in any suitable manner, such as, for example, with adjustable screws 74 attached to the bottom of the tray 14. The tray 14 can also be designed to have a fixed slope capable of draining the liquid 40 towards edge 36. The animal enclosure 10, the tray 14, and the hopper 16 can be made of any suitable material, such as, for example, metal or plastic.

In the illustrated embodiment, a tube 42 with caps 44 on both ends and a T-fitting 46 in the center of the tube 42, is positioned on the side of the tray 14 that is opposite to the edge 36 through a notch 50. The tube 42 may have any suitable configuration and construction and can be positioned in any suitable manner, such as, for example, removably secured to the tray 14 through the notch 50 using an adhesive such as, for example, rubber cement. The tube 42 can also be positioned on other sides of the tray 14. The T-fitting 46 connects the tube 42 to a tubing 52. The tube 42 has a plurality of openings 54 through which liquid 40 enters the tray 14 to permit continuous flow of liquid 40 in the tray 14. The tube 42 may also have any form of openings 54 that permit passage of liquid 40 to the tray 14. The tube 42, the tubing 52, and the T-fitting 46 are made of flexible plastic, but they can also be made of any suitable material such as, for example, metals, or any other suitable material that is compatible with the liquid 40 containing animal waste.

In the illustrated embodiment, the hopper 16 is associated with the tray 14 to permit draining of the liquid 40 with waste from tray 14. The hopper 16 may have any suitable configuration and construction, such as, for example, comprising three raised sides 60, a floor 62, and an opening 64 to drain the liquid 40. The hopper 16 may be associated with the tray 14 in any suitable manner, such as, for example, positioned separately below the tray 14. The hopper 16 is associated with the edge 36 of the tray 14. The floor 62 of the hopper 16 slopes to enable the liquid 40 drain through the opening 64.

In the illustrated embodiment, the filtration system 12 comprises a filtration unit 24, a circulating pump 70, a sterilizer 72, and an auto-shut off float-switch 76, each of which may have any suitable configuration and construction. The base member 20 is made of wood, and the filtration unit 24 is made of acrylic. The base member 20 has a hinged door 80 for easy access to a pullout shelf 82 on which the filtration unit 24 rests. The filtration unit 24 comprises a mesh basket 66, which is a screen made of any suitable material such as, for example, metal. The mesh basket 66 may have any suitable configuration and construction and can be positioned in any suitable manner. The liquid 40 containing the waste exits the hopper 16 and enters the mesh basket 66. The mesh basket 66 is positioned removably below the hopper 16 and is held by supports 68. The mesh basket 66 is useful to trap and dispose large particulate debris such as, for example, seeds, hulls, and feathers. The liquid 40 passes through the mesh basket 66 and enters a coarse foam mat 84 positioned below the mesh basket 66. The coarse foam mat 84 may have any suitable configuration and construction and may be made of any suitable material such as, for example, porous filter layer.

In the illustrated embodiment, the coarse foam mat 84 rests on a porous tray 88 held by supports 86. The foam mat 84 can also be placed directly on top of fiberglass blocks 90. The foam mat 84 is held on supports 86 that are positioned above the fiberglass blocks 90 with a gap. The liquid 40 from the mesh basket drains and passes through the foam mat 84. The foam mat 84 may be any other form of a suitable porous filter layer. The foam mat 84 traps and holds fine particulate such as dander and granular waste. The foam mat 84 can be removed, rinsed, and replaced as necessary. The foam mat 84 is made of a porous filter layer such as, for example, a bonded filter pad that is capable of trapping particulate waste. The foam mat 84 or other similar filter material can be obtained from standard hardware stores or from filter manufacturers.

In the illustrated embodiment, the filtration unit 24 accommodates a plurality of fiberglass blocks 90 containing biological media positioned below the foam mat 84. The fiberglass blocks 90 may have any suitable configuration and construction and may be positioned in any suitable manner within the filtration unit 24. In the illustrated embodiment, the fiberglass blocks 90 are porous and contain biological media such as, for example, bacterial colonies. The biological media may include any suitable microbial population capable of degrading unwanted organic material in the liquid 40. The biological media may also include any biological component such as, for example, enzymes that can degrade unwanted organic material in the liquid 40. The fiberglass blocks 90 rest on a support 92. In the illustrated embodiment, there is space between the foam mat 84 and the fiberglass blocks 90. The support 92 can be raised so that the fiberglass blocks 90 rest directly below the foam mat 84 without any observable space. The fiberglass blocks 90 containing biological media with bacterial colonies can be obtained from standard pet stores or from other biological media manufacturers such as, for example, Coral Life (Carson, Calif.) and Kent Marine (Acworth, Ga.). The liquid 40 flows through the fiberglass blocks 90 and enters a carbon cartridge 94. The fiberglass blocks 90 containing biological media may immersed in the liquid 40 within the filtration unit 24. Other biological media such as Bio-Mate, Bio-Sponge Balls, Lee's Bio-Pin Balls and Bio-Chem Stars can be obtained from aquarium supply stores and ordered from aquarium supply catalogs such as, Doctors, Foster & Smith (www.DrsFosterSmith.com).

In the illustrated embodiment, the carbon cartridge 94 fits into a vertical slot 98 in the filtration unit 24 and contains activated carbon to remove odors to further purify the liquid 40. The carbon cartridge 94 may be any carbon filter, may have any suitable configuration and construction, may contain any suitable material such as, for example, activated charcoal, and may be positioned in any suitable manner within the filtration unit 24. The carbon cartridge 94 comprises a snap-open plastic cartridge filled with activated carbon. The carbon cartridge 94 may also be a canister filled with carbon such as, for example, hang-on type canisters filled activated carbon used in aquarium products. The carbon cartridge 94 is commercially available from manufacturers such as, for example, Supreme Biomatrix (Central Islip, N.Y.) and Tetratec by Tetra (Blacksburg, Va.). The carbon cartridge 94 or its contents, such as, for example, granular activated carbon, found in pet stores featuring aquarium products, can be replaced as often as necessary.

In the illustrated embodiment, the filtration unit 24 may comprise the mesh basket 66, the foam mat 84, and the carbon cartridge 94. The fiberglass blocks 90 with the biological media or any other biological media such as Bio-Mate and Bio-Sponge Balls need not be included in the filtration unit 24.

In the illustrated embodiment, a tubing 52 connects a pump 70 to the T-fitting 46 in the tray 14. The pump 70 permits circulation of the liquid 40 from the filtration unit 24 to the tray 14. The pump 70 may have any suitable configuration and construction, and may be positioned in any suitable manner within the base member 20. The pump 70 is within the liquid reservoir 96 and is connected to an electrical outlet 102. The liquid reservoir 96 is part of the filtration unit 24 and accommodates the pump 70. The pump 70 can also be positioned outside the reservoir 96.

In the illustrated embodiment, the liquid reservoir 96 of the filtration unit 24, has a controllable drain 100 to drain the liquid 40, if necessary, without disturbing other components of the filtration unit 24. The controllable drain 100 may have any suitable configuration and construction, and may be positioned in any suitable manner within the filtration unit 24.

In the illustrated embodiment, the filtration system 12 is further configured to include a sterilizer unit 72 capable of eliminating unwanted microbial growth in the circulating liquid 40. The sterilizer unit 72 may have any suitable configuration and construction, and may be positioned in any suitable manner within the base member 20. An ultraviolet sterilizer unit 72 is connected posterior to the pump 70 and anterior to the tray 14 and is positioned outside the filtration unit 24. The sterilizer unit 72 and is connected to the electrical outlet 102. Other modes of sterilization such as, for example, irradiation, chlorination, bromination, or application of antimicrobial agents can also be implemented.

In the illustrated embodiment, the filtration system 12 is configured to provide an auto-shut off float-switch 76 that controls the pump 70 when the liquid level falls below the fill line 104 in the reservoir 96. The automatic shut-off float switch 76 may have any suitable configuration and construction, and may be positioned in any suitable manner within the liquid reservoir 96. The automatic shut-off float switch 76 is positioned inside the reservoir 96 at a suitable height, such as, for example, at the fill-line 104, and is connected to the electric outlet 102. An automatic shut-off float-switch 76 can be obtained from a standard hardware store. Any other method of controlling the pump 70 can also be implemented. The liquid 40 refers to any substance capable of flowing freely, such as, for example water.

The filtration system 12 may have other suitable configurations such as, for example, a configuration that fits a large floor-model animal enclosure 10 that rests within a tray 14 on stainless steel supports. The tray 14 may have any suitable configuration, such as, for example, same size and shape as the enclosure 10 or of smaller or a larger size than the enclosure 10. The grid floor 26 of the enclosure 10 may be modified with any another suitable permeable floor. Legs, casters or other supports of a typical floor model animal enclosure 10 may be eliminated. The shape of the base member 20, the hopper 16, and the hopper's opening 64 may have any suitable shape, such as, for example, the hopper 16 may be conical and the hopper's opening 64 may be rectangular.

The mesh basket 66 may have any suitable configuration such as, for example, a flat, lift-out screen. The shape of the mesh basket 66 may have any suitable configuration such as, for example, rectangular, or conical. The mesh basket 66 can be placed directly on top of the foam mat 84 without any support or can be held from a support 86. The mesh basket 66 may also be substituted by a flat permeable screen that traps large particulate matter such as seeds, hulls, and feathers. This screen may rest on top of the foam mat 84 or can rest within the hopper 16 and may have any suitable configuration and construction such as, for example, rectangular, circular, or cubical, cylindrical or spherical in shape. The screen may be made of any suitable material such as, for example, plastic, metallic or any other suitable liquid-compatible material.

The fiberglass blocks 90 with bacterial colonies may be substituted with other commercially available biological filter media such as, for example, Bio-Balls, manufactured by Coral Life, a subsidiary of Energy Savers Unlimited (Carson, Calif.).

The order of the mesh basket 66, foam mat 84, the fiberglass blocks 90, and the carbon cartridge 94 may be suitably interchanged. For example, the carbon cartridge 94 may be placed directly above the fiberglass blocks 90.

The pump 70 may have any suitable configuration. Operating requirements of the pump 70 depends on the amount of liquid 40 to be circulated, the speed with which the liquid 40 needs to be circulated, the noise level of the pump 70, and also on the power consumed. The specifications of a suitable pump 70 can be determined by one of ordinary skill in the art and can be obtained from a standard pump manufacturer. The pump 70 can be positioned inside the liquid reservoir 96 or outside the liquid reservoir 96. The pump 70 can also be positioned at a remote location from the liquid reservoir 96.

The filtration system 12 can also be designed to fit animal enclosure 10 of smaller size, such as, for example, portable table-top bird cages. The size, shape, and the components of the tray 14, hopper 16, and the filtration unit 24 can be suitably modified to fit any other enclosure, such as, for example, a small table-top bird cage.

A filtration unit 24 for a small table-top portable bird cage may have any suitable configuration. The filtration unit 24 for a table-top bird cage may comprise, for example, a mesh basket 66, foam mat 84, and a carbon cartridge 94. The liquid 40 can be replaced as necessary.

The filtration system 12 can also be configured to include a series of interconnected trays 14, hoppers 16, and mesh baskets 66 that trap and remove waste from multiple animal enclosures 10 positioned serially. The liquid 40 with waste materials may drain into a common filtration unit 24 for filtering.

The filtration system 12 can also be configured to provide a large body of liquid 40 of sufficient dimensions to cover multiple animal enclosures 10 positioned separately, for example in a laboratory or in an aviary. Waste materials from multiple enclosures 10 will be trapped for further filtering by the filtration unit 24. Such configurations can be constructed for commercial or residential use to provide easy maintenance to filter waste from multiple enclosures 10. The specifications of the tray 14, filtration unit 24, the pump 70, the sterilizer 72, and other components of the filtration system 12 can be appropriately configured to account for the increased volume of liquid 40 and the waste generated.

The filtration system 12 can also be configured to have a filtration unit 24 at a remote location from the enclosure 10, for example, in the back yard, in a separate room, or in the basement of a house. This may be achieved by connecting a tubing 52 to the hopper 16 and extending the tubing 52 to the distant location of the filtration unit 24. The liquid 40 can be circulated from a distant location through a suitable pump 70.

The filtration system 12 can also be configured to have the tray 14 designed in such a way that eliminates the use of a hopper 16. For example, the edge 36 of the tray 14 can be designed such that the tray's 14 void 38 narrows as a funnel, which is capable of draining the liquid 40 directly into a filtration unit 24 without the hopper 16.

The filtration system 12 can also be configured to have a commercial filtration unit. The commercial filtration units can be adapted to filter the liquid 40 with waste described herein. Such commercial filtration units may use a filtering mechanism that may be different from the one disclosed in the illustrated embodiment without deviating from the scope disclosed herein.

The filtration system 12 can also be configured to provide an optimal flow-speed for the liquid 40 in the tray 14, such that sufficient time lapses for an animal handler to visually observe the condition of the excreta. Visual monitoring of the animal excreta such as bird droppings may be helpful in diagnosing illness. An optimal flow-speed for the liquid 40 can be set using a standard valve at the T-fitting 46 to regulate the flow of liquid 40, by controlling output of the pump 70, or by adjusting the slope of the tray 14 that contains the liquid 40. The level of the liquid 40 flowing in the tray 14 can be suitably adjusted by modulating the flow-speed of the pump 70, by adjusting the slope of the tray 14, or by adjusting the opening 64 of the hopper 16. The level and the speed of flow of liquid 40 may depend upon the amount of waste generated, the filtering capacity of the filtration unit 24, and the pumping capacity of the pump 70.

The filtration system 12 can also be configured to provide a soothing sound of flowing liquid 40 to the animals in the enclosure 10 as well as to the animal handlers and pet owners. This may be achieved by adjusting the speed of the flow of the liquid 40 to create a comfortable and a soothing sound. In addition, the flow of the liquid 40 in the tray 14 can be modified, such as, for example, through a bed of pebbles or rocks to create natural sounds.

The filtration system 12 can also be configured to have the enclosure 10, the tray 14, and the hopper 16 made of durable stainless steel to minimize wear and tear and also to reduce microbial contamination by having a non-porous surface. The stainless steel components may have round edges to reduce injury to animals and animal handlers. The components of the filtration system 12 and the enclosure 10 can also be made of other suitable materials such as, for example, plastic, metallic alloys, aluminum, composite fibers, or any other suitable material that is compatible with liquid 40 containing waste.

The filtration system 12 can also be configured to provide humidity to animals in the enclosure 10. This may be achieved by the continuous movement of the liquid 40 such as, for example, water. Increase in humidity may be beneficial to certain caged animals, for example, birds in bird cages.

The filtration system 12 can also be configured to provide fragrance to the circulating liquid 40 for an aromatherapy. This may be achieved by adding chemicals or extracts or any other formulations to the liquid 40, which release desired fragrance to the environment. These chemicals or extracts or any other formulations can also be used to mask any odor arising from the waste containment system and can be supplemented as necessary.

One way of operating the filtration system 12 is to position an animal enclosure 10 for waste removal, above a tray 14. A filtration unit 24 is filled with a liquid 40 to a fill line 104. In the illustrated embodiment, the liquid 40 is water. A pump 70 and a UV sterilizer 72 are connected in series as shown in FIGS. 1–3. A tubing 52 connects the pump 70 and the UV sterilizer 72 to the tray 14. A tube 42 is connected to a T-fitting 46 at the center, which is connected to a tubing 52. When the pump 70, positioned within a base member 20, is turned on, the liquid 40 is delivered through a plurality of openings 54 in the tube 42, to form a body of liquid 40 that flows continuously across the tray 14. The flowing liquid 40 traps and gradually removes waste and other airborne particulate that descend from the enclosure 40. The waste-filled liquid 40 drains through an edge 36 of the tray 14 into a hopper 16. For large particulate waste such as, for example, large food particles or other large waste particles, a brush or any other similar device may be used to move the waste towards the hopper 16. A base member 20 accommodates a mesh basket 66, a filtration unit 24, a pump 70, and a sterilizer 72. The hopper 16 channels the liquid 40 into the mesh basket 66. The mesh basket 66 rests on top of a foam mat 84. The mesh basket 66 can be removed and cleaned daily to dispose debris such as seeds, feathers, and hulls. The liquid 40 with any finer particulate continues to flow through the foam mat 84.

The foam mat 84 is useful to trap and hold the finer particulate such as dander and granular waste. The liquid 40 then flows into a plurality of fiberglass blocks 90 with bacterial colonies capable of decontaminating the liquid 40. The fiberglass blocks 90 rest on a support 92. A carbon cartridge 94, a circulating pump 70 and the reservoir 96 are also part of the filtration unit 24. The liquid 40 from the fiberglass blocks 90 enters the carbon cartridge 94. The carbon cartridge 94 removes odors and purifies the water collected in the reservoir 96. The pump 70 is connected to a sterilizer unit 72, which is connected to the T-fitting 46 within the tube 42 by a tubing 52. Filtered liquid 40 is circulated to the tray 14 to continue the filtering process described above. The liquid 40 is recycled as a filtering medium by the filtration unit 24.

In the illustrated embodiment, the following steps may be practiced for periodic maintenance of the filtration system on a daily basis or as necessary:

(a) Move any large particulate waste on the tray 14 towards the hopper 16 with a brush or any other similar device (b) The pump 70 is turned off (c) The mesh basket 66 is removed and the accumulated waste is disposed (d) The mesh basket 66 is replaced (e) The fill line 104 is checked and the required amount of liquid 40 is replenished if necessary (f) The pump 70 is turned on.

The following steps may be performed on a weekly basis or as needed:

(a) The pump 70 is turned off (b) The coarse foam mat 84 is removed, rinsed and replaced (c) The carbon cartridge 94 is removed, rinsed and replaced (d) The pump 70 is turned on.

Additionally, if needed, the reservoir 96 can be drained using a controllable drain 100, without disturbing or removing other components of the filtration unit 24. The reservoir 96 may be replenished with fresh liquid 40.

There is a plurality of advantages that may be inferred from the present disclosure arising from the various features of the apparatus, systems, and methods described herein. It will be noted that other embodiments of each of the apparatus, systems, and methods of the present disclosure may not include all of the features described yet still benefit from at least some of the inferred advantages of such features. Those of ordinary skill in the art may readily devise their own implementations of an apparatus, system, and method that incorporate one or more of the features of the present disclosure and fall within the spirit and scope of the disclosure.

I claim:

1. A filtration system for an animal enclosure for filtering waste from the enclosure, the system comprising:
    a receptacle including an edge and defining a cavity configured to permit passage therethrough of a liquid and the waste from the enclosure, the receptacle configured to receive the liquid and waste into the cavity and to discharge over the edge the liquid and the waste from the cavity;
    a hopper associated with the receptacle defining an opening configured to permit draining of the liquid passing over the edge of the receptacle;
    a filtration unit associated with the receptacle for receiving the liquid and waste from the cavity and for filtering the waste from the liquid; and
    a pump for delivering the liquid from the filtration unit to the receptacle to permit circulation of the liquid.

2. The filtration system of claim 1, wherein the liquid flows continuously through the cavity.

3. The filtration system of claim 1, wherein the liquid is water.

4. The filtration system of claim 1, wherein the filtration unit comprises:
    a permeable screen;
    a porous filter layer; and
    a carbon filter.

5. The filtration system of claim 4, further comprising a biological media.

6. The filtration system of claim 5, wherein the biological media comprises bacteria.

7. The filtration system of claim 1, further comprising a sterilizer unit for inhibiting microbial growth in the liquid.

8. The filtration system of claim 7, wherein the sterilizer unit is an ultra-violet sterilizer.

9. The filtration system of claim 1, further comprising an auto-shut off float switch for controlling the pump.

10. The filtration system of claim 1, wherein the liquid comprises a material capable of providing fragrance.

11. A filtration system for an animal enclosure for filtering waste from the enclosure, the system comprising:
    a tray defining a cavity including an edge configured to permit passage therethrough of a liquid and the waste from the enclosure, the tray configured to receive the liquid and waste into the cavity and to discharge the liquid and the waste over the edge of said tray;

a filtration unit associated with the tray for receiving the liquid and waste from the cavity and for filtering the waste from the liquid; and a pump for delivering the liquid from the filtration unit to the tray to permit circulation of the liquid.

12. The filtration system of claim 11, wherein the tray comprises three raised sides and an edge defining a void.

13. The filtration system of claim 12, wherein the tray is configured to slope towards the edge defining a void.

14. The filtration system of claim 13, wherein the slope of the tray is adjusted with screws associated with the tray.

15. A waste containment system comprising:

an animal enclosure having a permeable floor;

a receptacle including an edge and defining a cavity configured to permit passage therethrough of a liquid and the waste from the enclosure, the receptacle configured to receive the liquid and waste into the cavity and to discharge over the edge the liquid and the waste from the cavity;

a hopper associated with the receptacle defining an opening configured to permit draining of the liquid passing over the edge of the receptacle;

a filtration unit associated with the receptacle for receiving the liquid and waste from the cavity and for filtering the waste from the liquid; and a pump for delivering the liquid from the filtration unit back to the receptacle to permit circulation of the liquid.

16. The waste containment system of claim 15, further comprising a sterilizer unit for inhibiting microbial growth in the liquid.

17. The waste containment system of claim 16, wherein the sterilizer unit is an ultra-violet sterilizer.

18. The waste containment system of claim 15, further comprising an auto-shut off float switch for controlling the pump.

19. The waste containment system of claim 15, wherein the enclosure is a bird cage.

20. The waste containment system of claim 15, wherein the liquid is water.

21. A method of filtering waste from an animal enclosure, the method comprising the steps:

(a) providing a body of liquid that flows through a cavity defined by a receptacle associated with the animal enclosure including an edge and configured to permit passage therethrough of a liquid and the waste from the enclosure, the receptacle configured to receive the liquid and waste into the cavity and to discharge over the edge the liquid and the waste from the cavity;

(b) providing a hopper associated with the receptacle defining an opening configured to permit draining of the liquid passing over the edge of the receptacle;

(c) filtering the waste from the liquid by a filtration unit; and (d) circulating the liquid from the filtration unit to the receptacle with a pump.

22. The method of claim 21, further comprising providing sterilization to the liquid.

23. The method of claim 21, further comprising providing an automatic shut-off control for the pump.

24. The method of claim 21, wherein the enclosure is a bird cage.

25. The method of claim 21, wherein the liquid is water.

26. A waste containment system comprising:

an animal enclosure having a permeable floor;

a receptacle including an edge and defining a cavity configured to permit passage therethrough of a liquid and the waste from the enclosure, the receptacle configured to receive the liquid and waste into the cavity and to discharge over the edge the liquid and the waste from the cavity;

a hopper associated with the receptacle defining an opening configured to permit draining of the liquid passing over the edge of the receptacle;

a filtration unit associated with the hopper for filtering the waste from the liquid;

a pump for circulating the liquid from the filtration unit back to the receptacle to permit circulation of the liquid;

a sterilizer unit for inhibiting microbial growth in the liquid; and an auto-shut off float switch for controlling the pump.

* * * * *